US011849130B2

United States Patent
Bruns et al.

(10) Patent No.: US 11,849,130 B2
(45) Date of Patent: *Dec. 19, 2023

(54) LOW LATENCY VIDEO CODEC AND TRANSMISSION WITH PARALLEL PROCESSING

(71) Applicant: Coherent Logix, Incorporated, Austin, TX (US)

(72) Inventors: Michael W. Bruns, Portland, OR (US); Martin A. Hunt, Austin, TX (US); Manjunath H. Siddaiah, Cedar Park, TX (US); John C. Sievers, Lynnfield, MA (US)

(73) Assignee: Coherent Logix, Incorporated, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,678

(22) Filed: Apr. 29, 2022

(65) Prior Publication Data

US 2022/0264130 A1   Aug. 18, 2022

Related U.S. Application Data

(63) Continuation of application No. 17/129,424, filed on Dec. 21, 2020, now Pat. No. 11,323,729, which is a
(Continued)

(51) Int. Cl.
*H04N 19/43* (2014.01)
*H04N 19/436* (2014.01)
(Continued)

(52) U.S. Cl.
CPC ......... *H04N 19/436* (2014.11); *G06F 9/3877* (2013.01); *H04N 19/107* (2014.11);
(Continued)

(58) Field of Classification Search
None
See application file for complete search history.

(56) References Cited

U.S. PATENT DOCUMENTS 10,264,257 B2 *   4/2019   Subramanya ........ H04N 19/103
2015/0091914 A1   4/2015   Cote et al.
(Continued)

FOREIGN PATENT DOCUMENTS

WO   2017197434 A1   11/2017
WO   2017205597 A1   11/2017

OTHER PUBLICATIONS

Cavium Networks; PureVu™ CNW36XX: Super Low Latency Full-HD Video Codec; Dec. 31, 2008; two pages.
(Continued)

*Primary Examiner* — Chikaodili E Anyikire
(74) *Attorney, Agent, or Firm* — Kowert, Hood, Munyon, Rankin & Goetzel, P.C.

(57) ABSTRACT

Methods and devices for a parallel multi-processor encoder system for encoding video data. The video data comprises a sequence of frames, wherein each frame comprises a plurality of blocks of pixels in sequential rows. For each frame, the system divides the plurality of blocks into a plurality of subsets of blocks, wherein each subset of blocks is allocated to a respective processor of the parallel multi-processor system. Each respective processor of the parallel multi-processor system may sequentially encode rows of the subset of blocks allocated to the respective processor and sequentially transmit each encoded row of blocks as a bit stream to a decoder on a channel. For each row, the respective encoded row of blocks is transmitted to the decoder for each processor prior to transmission of the next
(Continued)

sequential respective encoded row of blocks for any processor. Additionally, a similar parallel multi-processor decoder system is described.

20 Claims, 12 Drawing Sheets

Related U.S. Application Data continuation of application No. 16/216,967, filed on Dec. 11, 2018, now Pat. No. 10,873,754.

(60) Provisional application No. 62/661,779, filed on Apr. 24, 2018, provisional application No. 62/597,457, filed on Dec. 12, 2017.

(51) Int. Cl.
  *G06F 9/38* (2018.01)
  *H04N 19/176* (2014.01)
  *H04N 19/146* (2014.01)
  *H04N 19/107* (2014.01)
  *H04N 19/147* (2014.01)

(52) U.S. Cl.
  CPC ......... *H04N 19/146* (2014.11); *H04N 19/147* (2014.11); *H04N 19/176* (2014.11)

(56) References Cited

U.S. PATENT DOCUMENTS

| | | | |
|---|---|---|---|
| 2015/0103920 A1 | 4/2015 | Rapaka et al. | |
| 2015/0139334 A1 | 5/2015 | Eregala et al. | |
| 2015/0237346 A1 | 8/2015 | Symes et al. | |
| 2016/0055305 A1 | 2/2016 | Hiriyannaiah et al. | |
| 2016/0142740 A1* | 5/2016 | Sharman | H04N 19/1883 375/240.12 |
| 2017/0064320 A1* | 3/2017 | Sadhwani | H04N 19/436 |

OTHER PUBLICATIONS

Fraunhofer HHI; Ultra Low Latency Video Codec; Mar. 20, 2010; two pages.
Cast, Inc.; White Paper: Video Streaming with Near-Zero Latency using Altera Arria V FPGAs and Video and Image Processing Suite Plus the Right Encoder; Jan. 2016; ten pages.
Cast, Inc.; White Paper: Understanding—and Reducing—Latency in Video Compression Systems; Oct. 2, 2013; four pages.
NGCodec; Celeno and NGCodec Demonstrate Sub-Frame Latency 5GHZ Wi-Fi Wireless Virtual Reality Solutions; Dec. 19, 2016; five pages.
NGCodec: NGCodec & VYUsync will showcase an Ultra-Low Latency H.265/HEVC Codec Solution based on Xilinx FPGAs and NAB Show 2017; Apr. 11, 2017; three pages.
Ribas-Corbera, Jordi; Chou, Philip A.; Regunathan, Shankar L.; "A Generalized Hypothetical Reference Decoder for H.264/AVC"; IEEE Trans. Circuits and Systems for Video Technology, vol. 13, No. 7, Jul. 2003, pp. 674-687.
Sachin Deshpande, Miska M. Hannuksela, Kimihiko Kazui, and Thomas Schierl; "An Improved Hypothetical Reference Decoder for HEVC"; Proceedings of the SPIE., vol. 8666, id. 866608; Feb. 21, 2013; 10 pages.
Hu, Wen-Chen; Multidisciplinary Perspectives on Telecommunications, Wireless Systems, and Mobile Computing, Chapter 12: Intra Refresh and Data-Partitioning for Video Streaming over IEEE 802.11c; Hershey, PA; IGI Publishing; Jan. 2013; pp. 200.
R. Schreier, A. Rothermel; "Motion Adaptive Intra Refresh for the H.264 Video Coding Standard"; IEEE Tr. on Consumer Electronics, vol. 52, No. 1; Mar. 13, 2006; pp. 249-253.
H. Chen, et. al.; Adaptive Intra-Refresh for Low-Delay Error-Resilient Video Coding: Signal and Information Processing Association Annual Summit and Conference (APSIPA), Dec. 9, 2014 Asia-Pacific, pp. 1-4.
X264 Settings (open source AVC/H.264 encoder software, -intra-refresh option); last modified on Feb. 7, 2011; 34 pages.
X265 (open source HEVC/H.265 encoder software -intra-refresh option); no date; three pages.
Written Opinion and International Search Report in International Application No. PCT/US2018/065146 dated Apr. 8, 2019.

* cited by examiner

LOW LATENCY VIDEO CODEC AND TRANSMISSION WITH PARALLEL PROCESSING

PRIORITY CLAIM

This application is a continuation of U.S. patent application Ser. No. 17/129,424, titled "Low Latency Video Codec and Transmission with Parallel Processing" filed on Dec. 21, 2020, which is a continuation of U.S. patent application Ser. No. 16/216,967, titled "Low Latency Video Codec and Transmission with Parallel Processing" filed on Dec. 11, 2018, now U.S. Pat. No. 10,873,754, and claims benefit of priority to U.S. Provisional Application No. 62/597,457 titled "Propose a Rolling Slice Based IP HEVC Encoder/Decoder" filed on Dec. 12, 2017, and U.S. Provisional Application No. 62/661,779 titled "Low Latency Encoder with Parallel Processing" filed on Apr. 24, 2018, all of which are hereby incorporated by reference in their entirety as if fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The field of the invention generally relates to video encoders and decoders used in wired and wireless communications.

DESCRIPTION OF THE RELATED ART

Encoders and decoders are used in many areas of wired and wireless communications. A transmitter may encode a message which is intended for reception by a specific receiver. Video encoding applications (e.g., for video streaming applications) introduce stringent latency and throughput requirements, as a large quantity of data needs to be encoded, transmitted, and decoded in real time so that the receiving device can display the decoded video without gaps in playback or undesirable reduction in video quality.

To address these and other concerns, improvements in the field are desired.

SUMMARY OF THE EMBODIMENTS

Various embodiments are described of systems and methods for utilizing a parallel multi-processor system for encoding and decoding video data.

In some embodiments, a parallel multi-processor video encoder system comprising a plurality of parallel processors coupled to respective non-transitory computer readable memory media is configured to encode video data, wherein the video data comprises a sequence of frames, wherein each frame comprises a plurality of blocks of pixels in sequential rows.

In some embodiments, for each frame of the video data, the video encoder system may divide the plurality of blocks into a plurality of subsets of blocks, wherein each subset of blocks is allocated to a respective processor of a parallel multi-processor system.

Each respective processor of the parallel multi-processor system may sequentially encode rows of the subset of blocks allocated to the respective processor and sequentially transmit each encoded row of blocks as a bit stream to a decoder on a channel. For each row, the encoded row of blocks of the respective row may be transmitted to the decoder for each processor prior to transmission of the encoded row of blocks of a row sequential to the respective row for any processor.

In some embodiments, a parallel multi-processor video decoder system comprising a plurality of parallel processors coupled to respective non-transitory computer readable memory may be configured to decode encoded video data, wherein the encoded video data comprises a sequence of encoded frames, wherein each encoded frame comprises a plurality of blocks of encoded pixels in sequential rows. In these embodiments, the video decoder system may receive the encoded video data from a channel. For each encoded frame of the sequence of encoded frames, the video decoder system may divide the plurality of blocks into a plurality of subsets of blocks, and may allocate each subset of blocks to a respective processor of the parallel multi-processor system.

Each processor of the parallel multi-processor system may sequentially decode rows of the subset of blocks allocated to the respective processor and combine the decoded rows of blocks to obtain a decoded frame. For each row, the decoded blocks of the respective row for each processor may be combined prior to combining decoded rows of blocks of a row sequential to the respective row for any processor. Finally, the video decoder system may output the decoded frames as a sequence of decoded frames.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the preferred embodiment is considered in conjunction with the following drawings, in which.

Figure 1:
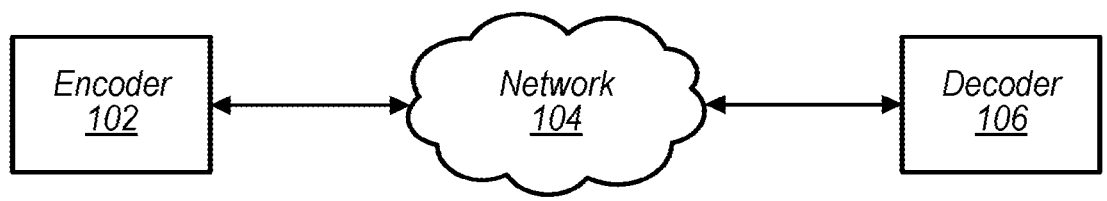
FIG. 1 is a diagram illustrating an encoder/decoder communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION OF EMBODIMENTS OF THE INVENTION

Incorporation by Reference

The following references are hereby incorporated by reference in their entirety as though fully and completely set forth herein:
1) Ribas-Corbera, Jordi, Chou, Philip A., Regunathan, Shankar & Chou, Philip A. (2003). "A generalized hypothetical reference decoder for H.264/AVC". *IEEE Trans. Circuits and Systems for Video Technology*, Vol. 7 No. 7, July, 2013, pp. 674-687.
2) Sachin Deshpande, Miska M. Hannuksela, Kimihiko Kazui, and Thomas Schierl, "An Improved Hypothetical Reference Decoder for HEVC," *Proceedings of the SPIE*. Volume 8666, id. 866608 9 pp. (February 2013).
3) Hu, Wen-Chen, *Multidisciplinary Perspectives on Telecommunications, Wireless Systems, and Mobile Computing, Chapter 12: Intra Refresh and Data-Partitioning for Video Streaming over IEEE* 802.11*c*, Hershey, PA, IGI Publishing, 2013. p. 200.
4) R. Schreier, A. Rothermel, "Motion adaptive intra refresh for the H.264 video coding standard", *IEEE Tr. on Consumer Electronics*, Vol. 52, No. 1, February 2006, pp. 249-253.
5) H. Chen, et. al., "Adaptive Intra-Refresh for Low-Delay Error-Resilient Video Coding", *Signal and Information Processing Association Annual Summit and Conference* (*APSIPA*), 2014 Asia-Pacific, pp. 1-4, 2014.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, optical storage, or ROM, EPROM, FLASH, etc. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical or optical signals.

Programmable Hardware Element—includes various hardware devices comprising multiple programmable function blocks connected via a programmable or hardwired interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Application Specific Integrated Circuit (ASIC)—this term is intended to have the full breadth of its ordinary meaning. The term ASIC is intended to include an integrated circuit customized for a particular application, rather than a general purpose programmable device, although an ASIC may contain programmable processor cores as building blocks. Cell phone chips, MP3 player chips, and many other single-function ICs are examples of ASICs. An ASIC is usually described in a hardware description language such as Verilog or VHDL.

Program—the term "program" is intended to have the full breadth of its ordinary meaning. The term "program" includes 1) a software program which may be stored in a memory and is executable by a processor or 2) a hardware configuration program useable for configuring a programmable hardware element or ASIC.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, e.g., imperative or procedural languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element or ASIC.

Computer System—any of various types of computing or processing systems, including a personal computer system (PC), mainframe computer system, workstation, network appliance, Internet appliance, personal digital assistant (PDA), grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

DETAILED DESCRIPTION

FIG. 1—Video Encoder and Decoder Communication System

FIG. 1 illustrates an exemplary (and simplified) video encoder/decoder communication system. The encoder and the decoder may be configured to implement low latency encoded video transmission, which may operate according to various video encoding standards such as high efficiency video encoding (HEVC) or another encoding standard. FIG. 1 shows an example communication system involving a video encoder 102 communicating with a video decoder 106 over a network 104. The video encoder 102 may be any of a variety of types of devices such as a cellular base station, a user equipment (UE) device, a network or cloud server, a wireless access point for performing Wi-Fi communications, such as according to the 802.11 standard or related standards, or another type of computing device. The network 104 may be of any of a variety of types of networks, including but not limited to a cellular network, a wired or wireless internet protocol (IP) network, a radio network or other type of broadcast network, a private network, or another type of network. The decoder 106 may be any of various devices such as a smart phone, tablet device, computer system, smart TV, portable video player, etc. One or both of the encoder 102 and decoder 106 may include encoder logic and/or decoder logic as described herein.

It is noted that the system of FIG. 1 is merely one example of possible systems, and embodiments may be implemented in any of various systems, as desired.

In some embodiments the encoder 102 may be configured to broadcast encoded video to the decoder 106. The term "broadcast" herein may refer to one-to-many transmissions that are transmitted for receiving devices in a broadcast area rather than being addressed to a particular device. Further, broadcast transmissions are typically unidirectional (from transmitter to receiver). In some situations, control signaling (e.g., ratings information) may be passed back to a broadcast transmitter from the receivers, but the content data is transmitted in only one direction. In contrast, cellular communication is typically bi-directional. "Cellular" communications also may involve handoff between cells. For example, in cellular communication embodiments, when the decoding receiver 106 moves out of the cell served by a cellular base station encoder 102, it may be handed over to another cellular base station (and the handover may be handled by the network, including operations performed by the encoder 102 and the other cellular base station). In contrast, when a user moves from the range covered by a first broadcast base station to the range covered by a second broadcast base station, it may switch to receiving content from the second broadcast base station, but the base stations do not need to facilitate handover (e.g., they simply continue broadcasting and do not care which base station a particular receiver is using).

Traditionally, broadcast transmissions are performed using different frequency resources than cellular transmissions. In some embodiments, however, frequency resources are shared between these different types of transmissions. For example, in some embodiments, a broadcast base station is configured to relinquish one or more frequency bands during scheduled time intervals for use by a cellular base station for packet-switched communications.

The encoder 102 and the decoder 106 may be configured to communicate over the network 104 using any of various RATs (also referred to as wireless communication technologies or telecommunication standards), such as LTE, 5G New Radio (NR), Next Generation Broadcast Platform (NGBP), W-CDMA, TDS-CDMA, and GSM, among possible others such as UMTS, LTE-A, CDMA2000 (e.g., 1×RTT, 1×EV-DO, HRPD, eHRPD), Advanced Television Systems Committee (ATSC) standards, Digital Video Broadcasting (DVB), etc.

Figure 2:
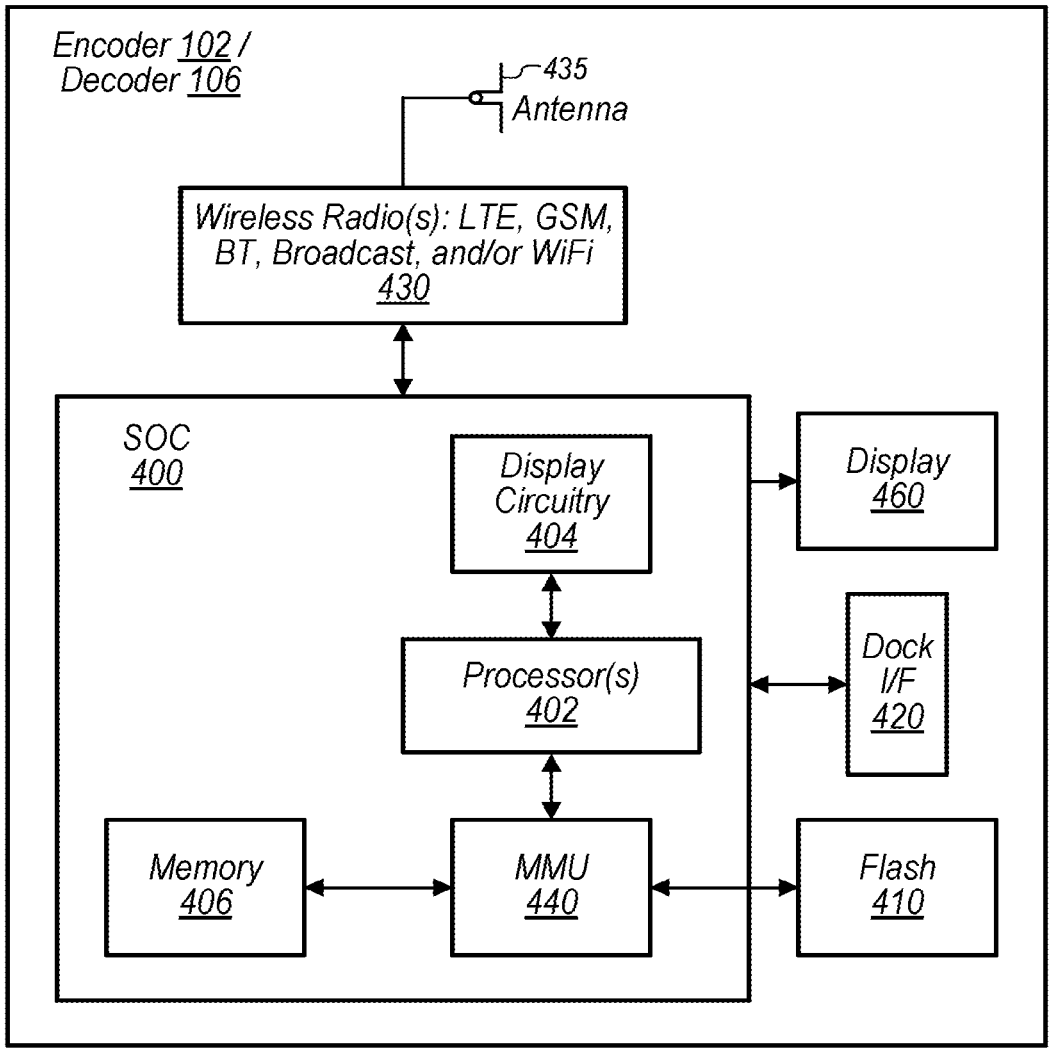
FIG. 2 is a block diagram illustrating an exemplary encoder/decoder device, according to some embodiments.

Broadcast and cellular networks are discussed herein to facilitate illustration, but these technologies are not intended to limit the scope of the present disclosure and the disclosed spectrum sharing techniques may be used between any of various types of wired and/or wireless networks, in other embodiments.

FIG. 2—Encoder/Decoder FIG. 2 illustrates an example simplified block diagram of an encoder device 102 or a decoder device 106. The encoder/decoder may be any of various devices as defined above. The encoder/decoder device 106 may include a housing which may be constructed from any of various materials.

As shown, the encoder/decoder device may include a system on chip (SOC) 400, which may include portions for various purposes. The SOC 400 may be coupled to various other circuits of the encoder/decoder device. For example, the encoder/decoder device may include various types of memory (e.g., including NAND flash 410), a connector interface 420 (e.g., for coupling to a computer system, dock, charging station, etc.), the display 460, wireless communication circuitry 430 such as for LTE, 5G New Radio (NR), GSM, Bluetooth (BT), WLAN, and/or broadcast, etc. The encoder/decoder device may further comprise one or more smart cards that implement SIM (Subscriber Identity Module) functionality. The wireless communication circuitry 430 may couple to one or more antennas, such as antenna 435.

As shown, the SOC 400 may include processor(s) 402 which may execute program instructions for the encoder/decoder device and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory (e.g., read only memory (ROM) or another type of memory) 406, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402. In some embodiments, the processor, MMU, and memory may be a distributed multiprocessor system. For example, the processor system may comprise a plurality of interspersed processors and memories, where processing elements (also called functional units) are each connected to a plurality of memories, also referred to as data memory routers. The processor system may be programmed to implement the methods described herein.

In some embodiments (not shown), the decoder device is configured to receive wireless broadcasts, e.g., from the video encoder device 102 of FIG. 2. In these embodiments, decoder device 106 may include a broadcast radio receiver. In some embodiments, the decoder device is configured to receive broadcast data and perform packet-switched cellular communications (e.g., LTE) at the same time using different frequency bands and/or the same frequency resources during different time slices. This may allow users to view TV broadcasts while performing other tasks such as browsing the internet (e.g., in a split-screen mode), using web applications, or listening to streaming audio. In other embodiments, the disclosed techniques may be used in systems with devices that are configured as broadcast receivers or for cellular communications, but not both.

The processor(s) 402 of the encoder/decoder device may be configured to implement part or all of the features described herein, e.g., by executing program instructions stored on a memory medium (e.g., a non-transitory computer-readable memory medium). In some embodiments, the processor(s) 402 may comprise a multiprocessor array of a plurality of parallelized processing elements. For example, the processor(s) 402 may be designed in accordance with the Coherent Logix HyperX™ architecture, or another parallel processor architecture. Alternatively (or in addition), processor(s) 402 may be configured as a programmable hardware element, such as an FPGA (Field Programmable Gate Array), or as an ASIC (Application Specific Integrated Circuit). Alternatively (or in addition) the processor(s) 402 of the encoder/decoder device, in conjunction with one or more of the other components 400, 404, 406, 410, 420, 430, 435, 440, 460 may be configured to implement part or all of the features described herein.

The encoder/decoder device may have a display 460, which may be a touch screen that incorporates capacitive touch electrodes. Display 460 may be based on any of various display technologies. The housing of the encoder/decoder device may contain or comprise openings for any of various elements, such as buttons, speaker ports, and other elements (not shown), such as microphone, data port, and possibly various types of buttons, e.g., volume buttons, ringer button, etc.

The encoder/decoder device may support multiple radio access technologies (RATs). For example, the encoder/decoder device may be configured to communicate using any of various RATs such as two or more of Global System for Mobile Communications (GSM), Universal Mobile Telecommunications System (UMTS), Code Division Multiple Access (CDMA) (e.g., CDMA2000 1×RTT or other CDMA radio access technologies), Long Term Evolution (LTE), LTE Advanced (LTE-A), 5G NR, and/or other RATs. For example, the encoder/decoder device may support at least two radio access technologies such as LTE and GSM. Various different or other RATs may be supported as desired.

In some embodiments, encoder/decoder device is also configured to transmit and/or receive broadcast radio transmissions which may convey audio and/or video content. In still other embodiments, a decoder device may be configured to receive broadcast radio transmissions and may not be configured to perform bi-directional communications over a network (e.g., the decoder 106 may be a media playback device).

Figure 3:
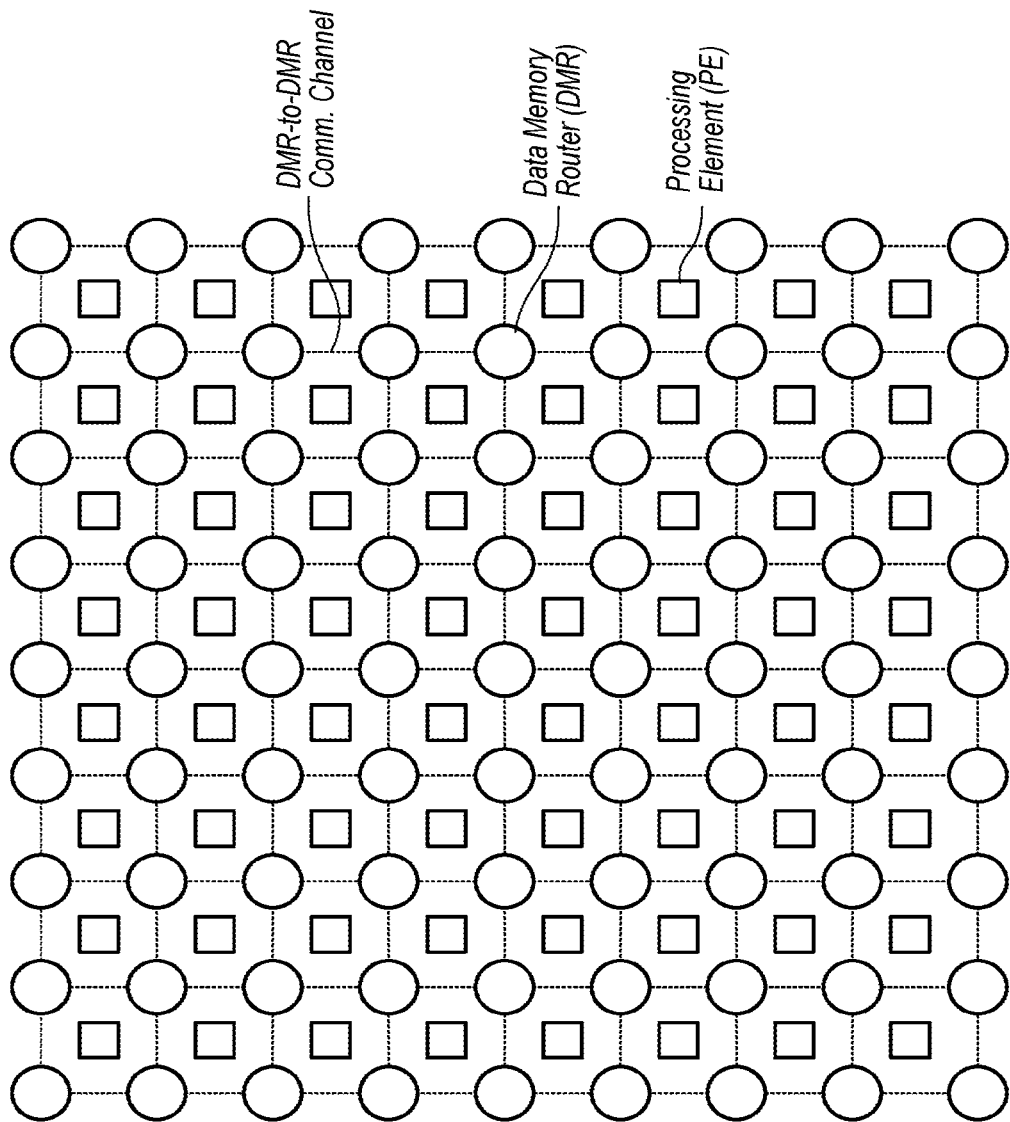
FIG. 3 is a schematic diagram of a parallel multi-processor system with interspersed processing elements, memory, and data memory routers, according to some embodiments.

FIG. 3 illustrates an example parallel multi-processor system that may be present in an encoder and/or decoder. In this example, the parallel multi-processor system may comprise a plurality of interspersed processors and memories, as shown where the rectangles are processing elements (also called functional units) and the circles are memories, also referred to as data memory routers. For example, one or multiple processing elements may be allocated a subset of columns of a video frame for encoding and/or decoding, as described in greater detail below. In other words, the term "processor" as used in reference to the parallel multi-processor system described herein may refer to either a single processing element or a group of a plurality of processing elements as illustrated in FIG. 3. Advantageously, methods described herein may employ distributed control to parallelize the encoding or decoding process without introducing a master controller to direct the encoding/decoding process.

The processor system may be programmed to implement the methods described herein. For more information on an example processor system architecture which may be used in some embodiments, please see U.S. Pat. Nos. 7,415,594 and 8,880,866, which are hereby incorporated by reference in their entirety as though fully and completely set forth herein. Another example of a processor system is a programmable hardware element (PHE) as defined above. For example, the decoder may include a PHE, such as an FPGA, which may be configured to implement the methods described herein.

Low Latency Encoder with Parallel Processing

Video encoder-decoder solutions are widely employed in today's technological environment, and it is desirable to reduce the latency introduced by the encoding and decoding processes while simultaneously preserving as much compression for the encoded video stream as possible. A long-standing problem in video encoder-decoder methods is to achieve an encoder-decoder solution with 1) end-to-end latency of less than one frame time; 2) inter and intra block prediction; and 3) parallel processing. Parallel processing as used herein may refer to high level concurrent processing of multiple sub-frame elements, as described in greater detail below. For example, parallel processing implementations may be useful for software-based implementations, but may more generally apply to any implementation that uses parallel processing to meet throughput requirements. Embodiments described herein provide methods whereby each picture frame of a video to be encoded may be divided into multiple tiles for independent parallel processing, wherein the encoded video stream is transmitted to the decoder through a communication network, and wherein it is received and processed by a decoder for real time display.

Embodiments described herein may apply to video encoder implementations following modern standards such as MPEG-2 Video, H.264(AVC), H.265(HEVC), VP8, VP9, the emerging AV1, and potentially future standards, among other possibilities. These standards may be described as block-based, motion compensated video compression methods which employ both intra- and inter-frame prediction in their coding methods. For example, these standards may be differentiated from simpler, intra-frame only coding standards such as Motion JPEG, Motion JPEG-2000, and VC-2. The combination of intra- and inter-frame coding tools in the modern compression standards achieve compression ratios of 200:1 or more with little to no visible distortion, depending on the source video content. While combined intra- and inter-frame prediction offers compression advantages over simpler encoding standards, it also introduces complications to the encoder-decoder process, as intra-frame and inter-frame prediction introduce different degrees of computational latency and overhead. While current implementations of combined intra- and inter-frame coding have been able to achieve sub-frame latency with a single thread of computation, embodiments herein improve on these legacy implementations by achieving sub-frame latency in a parallel processing implementation, as described in greater detail below.

Figure 4:
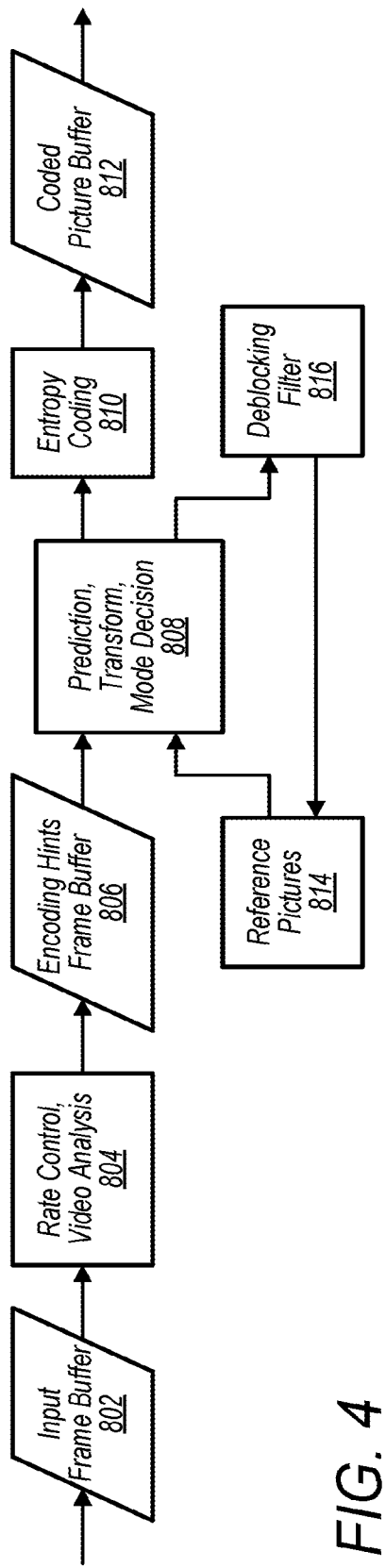
FIG. 4 is flow diagram illustrating a basic frame-based encoding pipeline, according to some embodiments.

FIG. 4—Basic Frame-based Encoder

FIG. 4 illustrates a typical encoding pipeline including a sequence of processing stages (depicted as rectangles in FIG. 4). Many implementations of block-based, motion compensated encoders are designed to operate with video frames as a basic unit of processing. Conventional implementations perform each processing stage on whole frames. The memory buffers between stages (illustrated as slanted parallelograms in FIG. 4) collect whole frames of data, so the minimum latency of the encoding pipeline is two frame-times. Notably, many such encoders with latency of two frames or more are labeled as low latency in marketing and academic literature.

Figure 5:
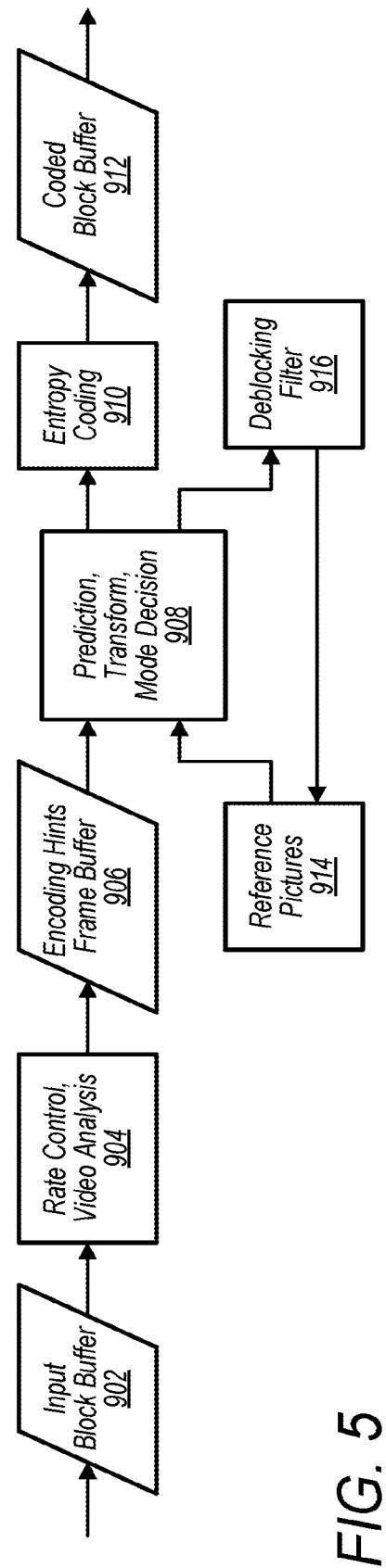
FIG. 5 is flow diagram illustrating a basic block-based encoding pipeline, according to some embodiments.

FIG. 5—Sub-Frame Latency Encoders

Other legacy implementations use the same simple pipeline with sub-frame workloads. For example, in the usual frame-based encoder the frame may be divided into tiles, slices, macroblocks, coding tree units or other units, referred to collectively as "blocks" in the descriptions herein and as illustrated in FIG. 5. In conventional sub-frame latency encoders, each function of the encoding process may be performed on block units and the results may be progressively sent from each process stage to the next.

The block-based approach may be applied to each operation in the encoding pipeline, including rate control (e.g., which may determine the quantization level for each block), video analysis (e.g., which may find encoding hints for each block), prediction/transform/mode decision (e.g., which may operate on each block), and entropy coding (e.g., which may perform entropy coding such as context-adaptive binary arithmetic coding (CABAC), or other types of entropy coding, on a per-block basis).

Block level granularity may result in much shorter latency than with frame-based encoding. The latency is not quite as short as just a few blocks because the input to the encoder must include enough buffering to convert input raster lines to blocks. For example, 32 lines of buffering may be used to partition the input picture into 32×32 blocks. This defines the latency of the input memory buffer. The rest of the processing stages of the encoder may add a few more block-times of latency, not including the coded block buffer, as discussed in greater detail below.

End-to-End Encoder-Decoder Latency

In some embodiments, the variability of coded block sizes may be large with mixed inter- and intra-prediction. Intra-prediction generally creates a poor prediction of an image block and may require additional bits for residual coding as transformed, quantized coefficients. In contrast, inter prediction can be nearly perfect. If a block is coded with inter prediction in skip mode it may occupy just a fraction of one bit in the coded bit stream after entropy coding.

The difference in size between intra- and inter-coded blocks may be 100:1 or more, in some embodiments. This may present a buffering problem at the output of the encoder, as a concentration of intra-coded blocks may increase the latency above subframe latency. In a conventional frame-based encoder as described above in reference to FIG. 4, the input to the coded picture buffer (CPB) in FIG. 4 is whole frames, but the output is bits at the stream rate. If a particular frame is coded using only intra-prediction, it may require many frame times to pass through the CPB. The extra delay for intra frames may then be recovered over the following inter-predicted frames which are much smaller. To avoid a processing bottleneck, the coded picture buffer size may need to be large enough to absorb the variations in size between frames without overflowing.

Figure 6:
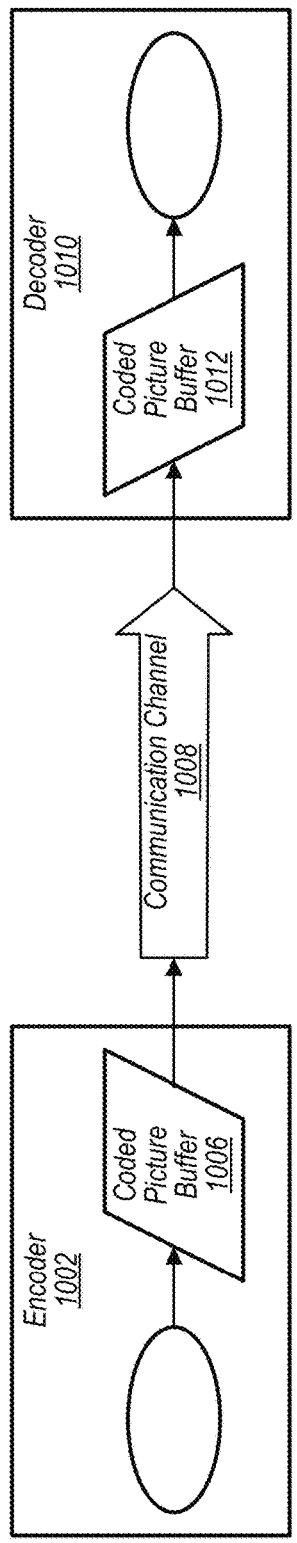
FIG. 6 is flow diagram illustrating an end-to-end system for real time encoding and decoding, according to some embodiments.

FIG. 6 illustrates a typical end-to-end encoder-decoder system for real time video transmission. As illustrated, the coded picture buffer at the decoder is complementary to that of the encoder. The two buffers may be effectively the same size and the resultant combined latency may be equal to this size divided by the stream rate. With a frame-based encoder the latency of the coded frame buffers may be a number of frame-times.

The block-based encoding approach described above is important to reduce the combined latency of the coded block buffer pair to less than one frame-time. With block-based encoding, the latency of the buffer may be as small as a number of block-times. Even with block level granularity, the coded block buffers may introduce most of the latency of the end-to-end system. The total latency of the end-to-end block-based system may be the sum of the coded block buffer latency plus the latency of all other processing stages in the encoder and decoder, which may be as short as a one to two block rows.

Sub-Picture Encoding Granularity in the High Efficiency Video Coding (HEVC) Standard The High Efficiency Video Coding (HEVC) standard introduced bit stream syntax to formalize sub-picture encoding granularity. In the standard, the term "Decoding Unit" (DU) is used to represent "block" as described herein. The encoder divides each frame into a number of DUs, each with an equal number of Coding Tree Units (CTU). Each CTU is typically 64×64 or 32×32 pixels (or another number of pixels) and each DU may represent one or more rows, columns, or tiles of CTUs.

The DU formalization was added to the HEVC standard specifically to support sub-frame latency real-time video transmission. However, it does not provide sub-frame latency when the DUs are assigned to concurrent, parallel processors because the output of the encoding process for the DUs is serialized. Embodiments described herein address this limitation by interleaving the outputs across the DUs as they are encoded in parallel, as described in greater detail below.

Intra-Refresh Coding

Intra-refresh is a coding technique found in state-of-the-art low latency encoders. A typical compressed video bit stream organization may include periodic intra-refresh only pictures which serve to restore correct display output after any previous bit stream transmission errors. In the HEVC encoding standard they are described as Instantaneous Decoder Refresh (IDR) pictures. These pictures don't make reference to any previously decoded information, so if the previously decoded pictures include errors due to earlier packet loss, the video may be correctly decoded from the IDR (intra-only) picture, preventing the cumulative building of transmission errors.

A processing complication is also introduced by periodic intra-only pictures, as they are very large compared to inter-predicted pictures. They often require multiple frame-times for transmission between the encoder and decoder, and they are not compatible with legacy sub-frame latency encoder/decoder systems (even those that operate on block level granularity).

The conventional approach for sub-frame latency systems that use combined inter- and intra-prediction is to use a technique commonly called intra-refresh to effectively constrain the rate of the bit stream within a short time span. This constraint may be based on compliance with the coded picture buffer model described above. If the encoder's coded picture buffer does not overflow, then the bit rate is adequately constrained, or compliant, with the given size of the buffer and the stream transmission rate. Coded picture buffer compliance may be accomplished by the rate control function in the encoder, which sets the size of each block by selecting how much quantization is required.

In some embodiments, an intra-refresh approach may assign a row or column in each picture to only include blocks with intra-prediction. The set of intra blocks may chosen so that there are few intra blocks in a row in the bit stream and the coded picture buffer or coded block buffer may be small and still perform its function of bit rate smoothing. A single threaded low-latency encoder may encode the blocks of the picture in raster order (i.e., row by row). In this case, orienting intra-refresh blocks in columns may be advantageous, to avoid having too many intra blocks grouped together in the bit stream.

The position of the intra-refresh column (or columns) may advance one column (or columns) with each frame and may therefore eventually wrap around the picture. This periodically refreshes the picture and causes incorrectly decoded parts of the picture due to earlier transmission errors to be corrected within a relatively small number of frames (e.g., a number of frames equal to the number of columns divided by the number of intra-refresh columns in each frame). The intra-refresh technique may include a constraint on motion compensation that prevents a picture from referencing unrefreshed blocks across the boundary of the intra-refresh column or columns.

Low Latency Video Encoder for Parallel Processing

Figure 7:
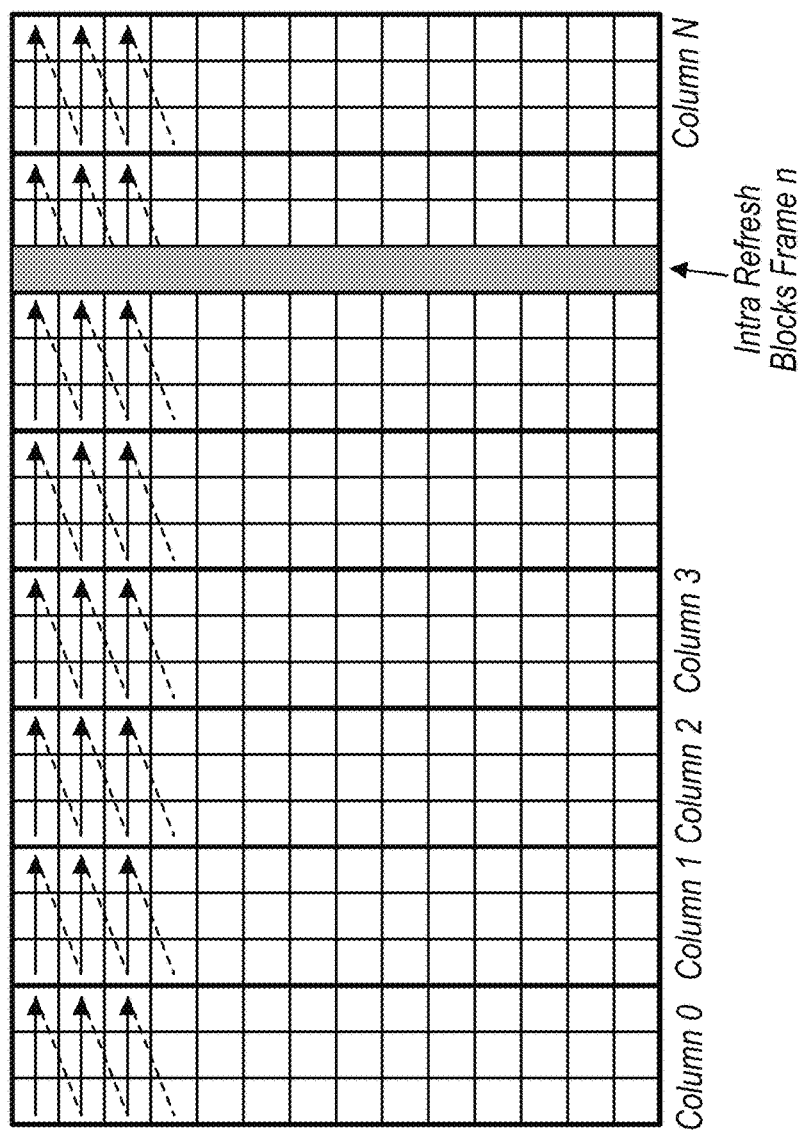
FIG. 7 is an example of video frame allocation showing processing flow for a plurality of parallel processors, according to some embodiments.

Embodiments herein address the technical problem of how to split the encoding process into multiple parallel tasks or threads with concurrent, independent execution. FIG. 7 is a schematic diagram of a video frame divided into columns for parallel processing. As illustrated, each of the N Columns (each of which comprise 3 columns of pixel blocks) is allocated to a separate processor of a parallel multi-processor system for encoding. Arrows show the block order of encoding. As illustrated, the gray shaded column is a column of intra-prediction blocks; while the unshaded columns will preferentially use inter-prediction (although, they may alternatively use intra-prediction if there is no good inter-prediction reference, in some embodiments). Some encoding standards define a structural container for frame divisions, such as tiles in HEVC. Advantageously, if there are no contextual dependencies between columns in the coded bit stream, they may be encoded and decoded with parallel independent tasks. Each task may produce a sub-stream of encoded bits that corresponds to one of the numerated columns in FIG. 7. The width of the picture may be divided into a plurality of subsets of block units as evenly as possible between the columns.

Figure 8:
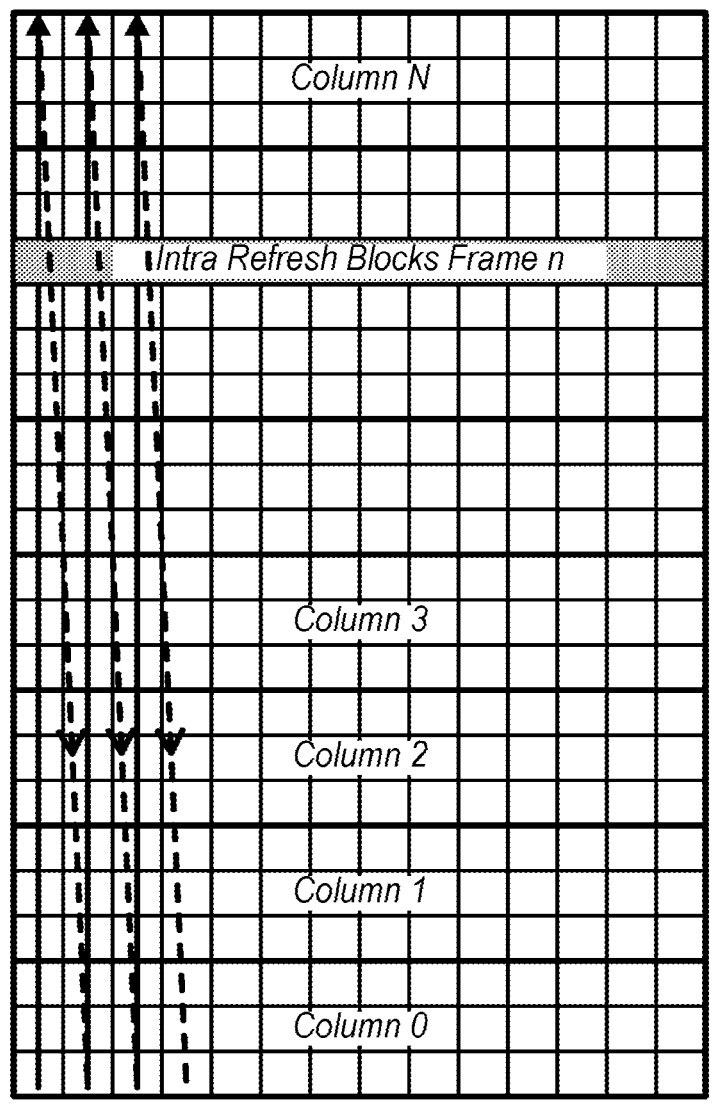
FIG. 8 is an example of video frame allocation showing the order of transmission of encoded rows over a channel by a plurality of parallel processors, according to some embodiments.

In this data decomposition, low latency may be achieved by orthogonally dividing the video frame into rows for processing. FIG. 8 is a similar schematic diagram to FIG. 7 that illustrates the ordering of transmission of encoded bits in the bit stream to the decoder. As illustrated, the N processors may be used to encode each row in parallel, and the results of the encoding may be output incrementally, row by row, through a coded row buffer. This is different from the Decoding Unit (DU) decomposition described above, in that a DU cannot be defined to span multiple partial tiles orthogonally. Each of the N processors may be configured to transmit their subportions of each row (e.g., the 3 blocks of pixels in each row allocated to a particular processor) before any of the N processors transmit a subportion of a subsequent row. Accordingly, all the subportions of blocks for a particular row may be transmitted as a row unit, prior to the transmission of and blocks from a subsequent row, such that the decoder may efficiently disambiguate between blocks from different rows. Each subportion of encoded blocks for a particular row may include a tag that indicates the column or columns of the video frame associated with the subportion. Advantageously, parallelization of the encoding process in this manner may significantly reduce the latency introduced in decoding a row of the video frame relative to un-parallelized encoding, and the reduction in latency of processors in the parallel multi-processor system. Additionally, waiting until each row is completely encoded by all processors before transmitting a subsequent row may enable the decoder to efficiently determine which row is associated with a particular encoded block.

Intra-refresh may be implemented with a column of intra-refresh blocks as shown in FIGS. 7 and 8. Within each row, most of the coded blocks are inter-refresh blocks, which distributes the latency introduced by intra-refresh block encoding equitably between the rows, and prevents an excessive concentration of latency in a particular row which may lead to buffer overflow or delayed transmission. This allows the size of the coded row buffer to be reduced to contain a small number of rows, and the delay to be reduced to a small number of row-times.

Figure 9:
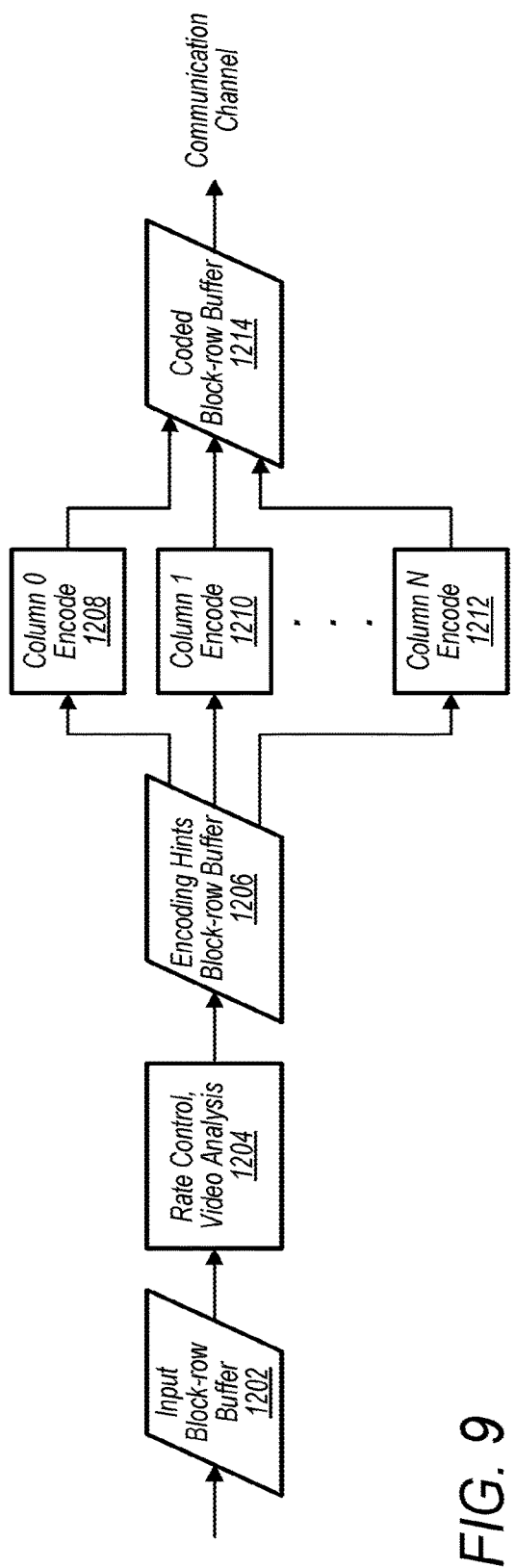
FIG. 9 is flow diagram illustrating a block-based encoding pipeline utilizing parallel processing, according to some embodiments.
Figure 10:
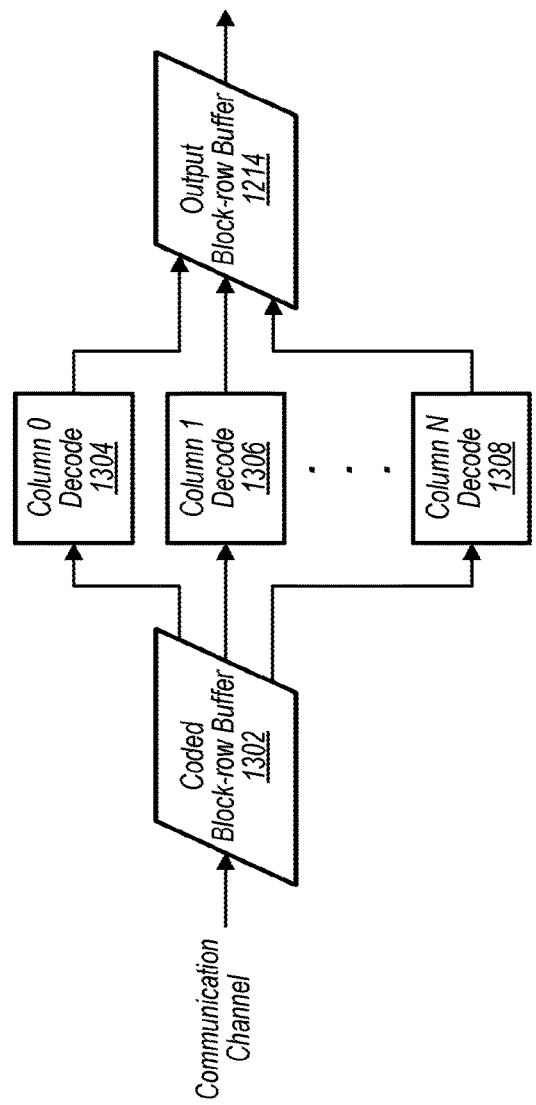
FIG. 10 is flow diagram illustrating a block-based decoding pipeline utilizing parallel processing, according to some embodiments.

FIGS. 9 and 10—Encoding and Decoding Pipeline with Parallel Processing

FIG. 9 is a schematic diagram illustrating a conceptual encoder architecture with parallel processing, according to some embodiments. In some embodiments, each "column n encode" block in FIG. 9 may represent the second processing stage of the encoding pipeline illustrated in FIG. 5. The complementary decoding process is illustrated in FIG. 10.

In some embodiments, the video frame is divided into N columns of blocks for parallel processing, wherein each of the N columns is allocated to a respective processor of a parallel multi-processor system. It is noted that the video frame is divided into columns for parallel processing in embodiments where the encoding process proceeds by a raster scan of sequential rows of the video frame (as is typically performed). However, it is intended that an encoding process according to embodiments herein may alternatively proceed by a vertical scan of sequential columns. In these embodiments, the video frame may be divided into N rows for parallel processing, wherein each of the N rows is allocated to a respective processor of the parallel multi-processor system. To refer generically to either of these embodiments, the term "rolumn" is introduced, where a rolumn as defined herein refers to either of a row or a column (of pixels or blocks of pixels) of the video frame.

For embodiments that employ HEVC standards, each column may be a tile several CTUs in width, and the tile height may be that of the video frame. The video frame may be divided orthogonally into rows for low latency video transmission. The incremental output of encoding may be taken from the N parallel encoding tasks in row units, effectively transmitting N parallel interleaved streams. Intra-refresh may be supported by causing a column of CTUs to be coded with intra-prediction.

Advantageously, this encoder organization may result in a system that enables parallel processing to achieve sub-frame latency in an encoder that supports inter and intra-prediction. Furthermore, a bit stream encoded according to embodiments described herein may be made compliant with the HEVC video compression standard and decodable by any compliant decoder device. Encoding with tiles is supported in all HEVC profiles including "Main Profile" and the format range extension profiles that were introduced in HEVC version 2. In some embodiments, each column in FIG. 7 may be assigned to a tile and may be compliant with the encoding standard if its width is 256 luma samples or greater, as one example.

Each tile in HEVC may be encoded independently and concurrently with all other tiles. Motion vector references may still cross tile boundaries, so the negative effect on compression efficiency may be much less than with picture partitioning schemes of other standards such as flexible macroblock ordering (FMO) in AVC/H.264.

Annex B Byte Stream

Many modern video compression standards define the specific form of a bit stream that may be used to transmit the video essence from encoder to decoder. The bit stream format specification may dictate the order of encoding elements, and how they are encoded into a single bit stream that can be parsed and decoded. It is important to note that the requirements for conformance to encoding Profiles and Levels are defined in Annex A of the standard and that adherence to Annex B is a separate criterion.

According to embodiments described herein, the encoder achieves sub-frame latency with parallel processing by interleaving the output of multiple independent encoding tasks by rows, which is outside of the definition of the Annex B byte stream. Most compliant HEVC decoding devices do require the Annex B format for their input, so embodiments herein may utilize a special decoder implementation with a matching input interface to the encoder. Embodiments herein may encode video to form a bit stream that may be post-processed to reorder the compressed video elements into the normative order specified in Annex B of the HEVC standard, to form a conventional bit stream. The output of the formatter may then be decoded in real time with a conventional HEVC decoding device or saved to a file. The latency of an end-to-end system including this Annex B formatter and conventional decoder may be approximately one frame longer than a system without the formatter and that uses a special decoder implementation.

Compatibility with Other Encoding Standards

The tile organization shown in FIG. 7 allows N parallel tasks to work on N tile columns. However, some encoding standards that pre-date HEVC do not include suitable syntax to divide a picture into independently coded columns. For example, the flexible macroblock ordering (FMO) syntax in the Baseline Profile of Advanced Video Coding (AVC/H.264) does not enable motion vectors to cross slice boundaries.

The encoding methods of embodiments described herein may still be used with these or other encoding standards, but the resulting bit stream may require re-encoding to be reformatted into a compliant bit stream. Some embodiments based on an encoding standard other than HEVC may utilize a proprietary encoder-decoder solution without any benefit of interoperability with standard-based decoding devices.

Applicable Device Technology

Some embodiments may apply both to encoders that are implemented using fixed function logic blocks in an ASIC or SOC, as well as to encoders implemented in software running on a parallel processing architecture. Examples of suitable processor devices may include the processor-memory network architecture of Coherent Logix's HyperX™ family of processors or the symmetric multiprocessor architecture (e.g. Intel Skylake™, with or without GPU acceleration).

Software implementations may be suitable for many applications because they allow full reconfigurability. The parallel processing approach may be advantageously used for software encoding because of the large amount of computations involved. Some embodiments may provide an adaptation of legacy software-based encoders for sub-frame latency.

The fixed function logic block approach may achieve sub-frame latency in real time with inter- and intra-frame prediction in a single thread of execution, but it may not be a suitable technology for some applications. For example, fixed function logic may not be reconfigurable, and its logic element may be unusable for other functions besides encoding. For example, it may not be updatable to add capabilities, fix bugs, or support a future encoding standard. Still, embodiments herein may be applied to encoders based on fixed function logic blocks working concurrently as a way to increase throughput beyond the capacity provided by a single device.

Image Scan Order

Many of the described embodiments are written assuming a conventional image raster scan order in which video lines are scanned from left to right, top to bottom. However, some embodiments may incorporate image sensors that are closely integrated with the input to the encoder, permitting alternative image scan orders. For example, samples may be scanned in minor order from top to bottom and in major order from left to right. The application of these embodiments may then take the form of independent row tiles encoded concurrently and simultaneously. The results of encoding may be collected with column granularity for transmission to a matching decoder. The intra-refresh band may then take the form of a row of intra-blocks that progresses down the frame with each successive picture. The encoding approach and benefits of the described embodiments may be achieved regardless of scan order, as sub-frame latency encoding using intra- and inter-frame prediction in a parallel processing implementation.

Figure 11:
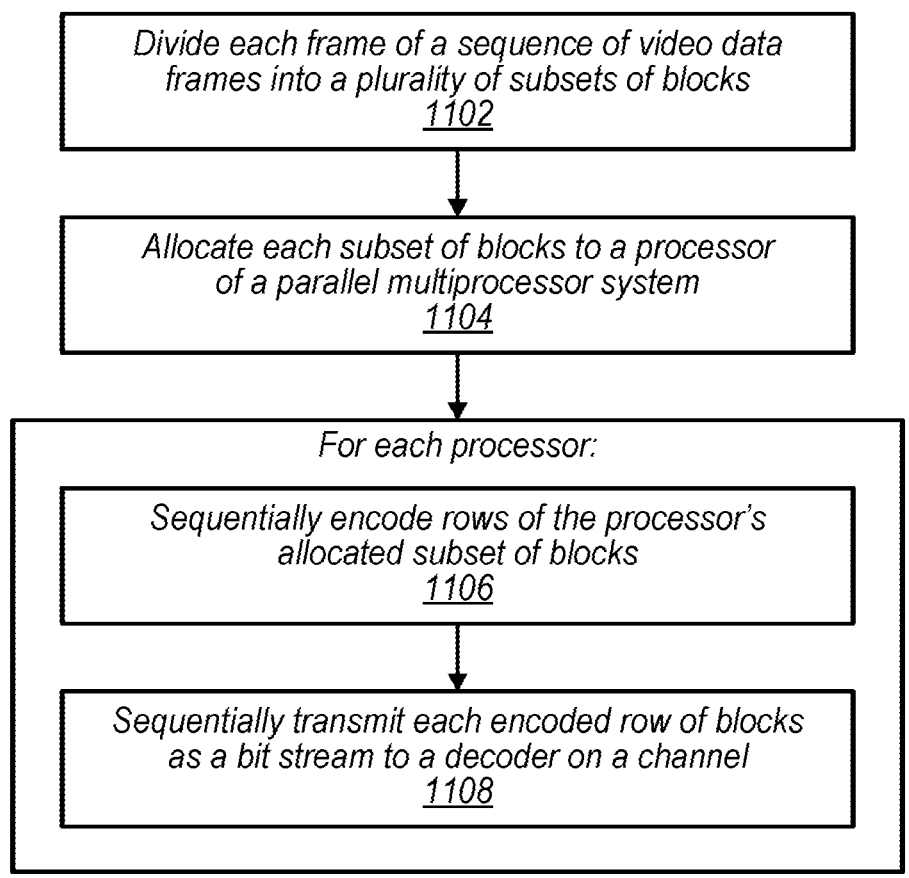
FIG. 11 is a flowchart diagram illustrating an exemplary method for a parallel multi-processor encoder system to encode and transmit a sequence of video frames, according to some embodiments.

FIG. 11—Parallel Subframe Latency Encoder Flowchart

FIG. 11 is a flowchart diagram illustrating an exemplary method for a parallel multi-processor encoder system to encode and transmit a sequence of video frames, according to some embodiments. The parallel multi-processor encoder system may be comprised within a UE 106, a base station 102, an internet server, or another type of computing device. The parallel multi-processor encoder system may comprise a plurality of parallel processors coupled to respective memory media, and may further comprise a master control processor configured to coordinate activity between the parallel processors. Some of the method elements shown may be performed concurrently, in a different order than shown, or may be omitted. Additional method elements may also be performed as desired. As shown, the method may operate as follows.

The encoder system may have stored thereupon, or may receive video data comprising a sequence of frames, wherein each frame comprises a plurality of blocks of pixels in sequential rows. At 1102, each frame may be divided into a plurality of subsets of blocks of pixels. The subsets of the plurality of blocks may comprise one or more columns of blocks of their respective frame.

In some embodiments, a second subset of the plurality of blocks may comprise intra-refresh blocks and the remaining blocks of the plurality of blocks outside the second subset may comprise non-intra-refresh blocks (e.g., inter-refresh blocks). In some embodiments, the intra-refresh blocks are equitably distributed between the rows of the frame. In some embodiments, the intra-refresh blocks are equitably distributed between the processors of the multi-processor system. In some embodiments, for each sequential frame, the blocks comprising the second subset of the plurality of blocks may be allocated to a different column or columns of the sequential frame.

At 1104, each subset of blocks may be allocated to a respective processor of the parallel multi-processor system. In some embodiments, the subsets of blocks may be allocated and transmitted to their respective processors. Alternatively, the entire plurality of blocks may be transmitted to each processor and each processor may then divide the plurality of blocks into a respective subset of blocks, and allocate this subset of blocks to itself for encoding.

In some embodiments, one or more of the processors may perform video analysis to determine encoding hints for each of the rows of blocks. For each of the rows of blocks, the respective encoding hints may be communicated to each processor of the parallel multi-processor system.

At 1106, each processor of the parallel multi-processor system may sequentially encode rows of the subset of blocks which are allocated to the respective processor.

In some embodiments, independent rate control may be implemented on the encoding process of each of the processors of the multiprocessor system. As one example, independent rate control may serve to promote comparable coded picture buffer occupancy for each of the rows of the video frames. Alternatively or additionally, independent rate control may be used to maintain a similar bit rate for each of the rows of the video frames. Rate control may be implemented for each row of blocks of the video frames, independent of the division of the frame into subsets of blocks allocated to each processor.

In some embodiments, upon completion of encoding of all rows of a frame, the encoded rows of the subsets of blocks may be stored as a respective encoded frame in a memory buffer (which may be a single memory buffer or a plurality distributed memory buffers) accessible to the processors of the parallel multiprocessor system. In these embodiments, said encoding may comprise encoding non-intra-refresh blocks based on an encoded frame corresponding to a previous frame, and the intra-refresh blocks may be encoded without reference to the encoded frame corresponding to the previous frame.

At 1108, each processor may sequentially transmit each encoded row of blocks as a bit stream to a decoder on a channel. For each row, the encoded row of blocks of the respective row may be transmitted to the decoder for each processor prior to transmission of the encoded row of blocks of a row sequential to the respective row for any processor.

In some embodiments, sequentially transmitting each encoded row of blocks as the bit stream to the decoder may comprise each processor tagging its encoded row of blocks with an identifier of a column location of the encoded row of blocks within the frame. Each processor may transmit the encoded row of blocks to a encoded row buffer for transmission to the decoder.

While the method described in FIG. 11 allocates subsets of blocks as columns of blocks and proceeds to sequentially encode each frame row by row, in other embodiments each frame may be divided into subsets comprising rows of blocks, and the parallel processors may encode each frame column by column. In other words, the rows and columns described in FIG. 11 may be switched, in other embodiments.

Figure 12:
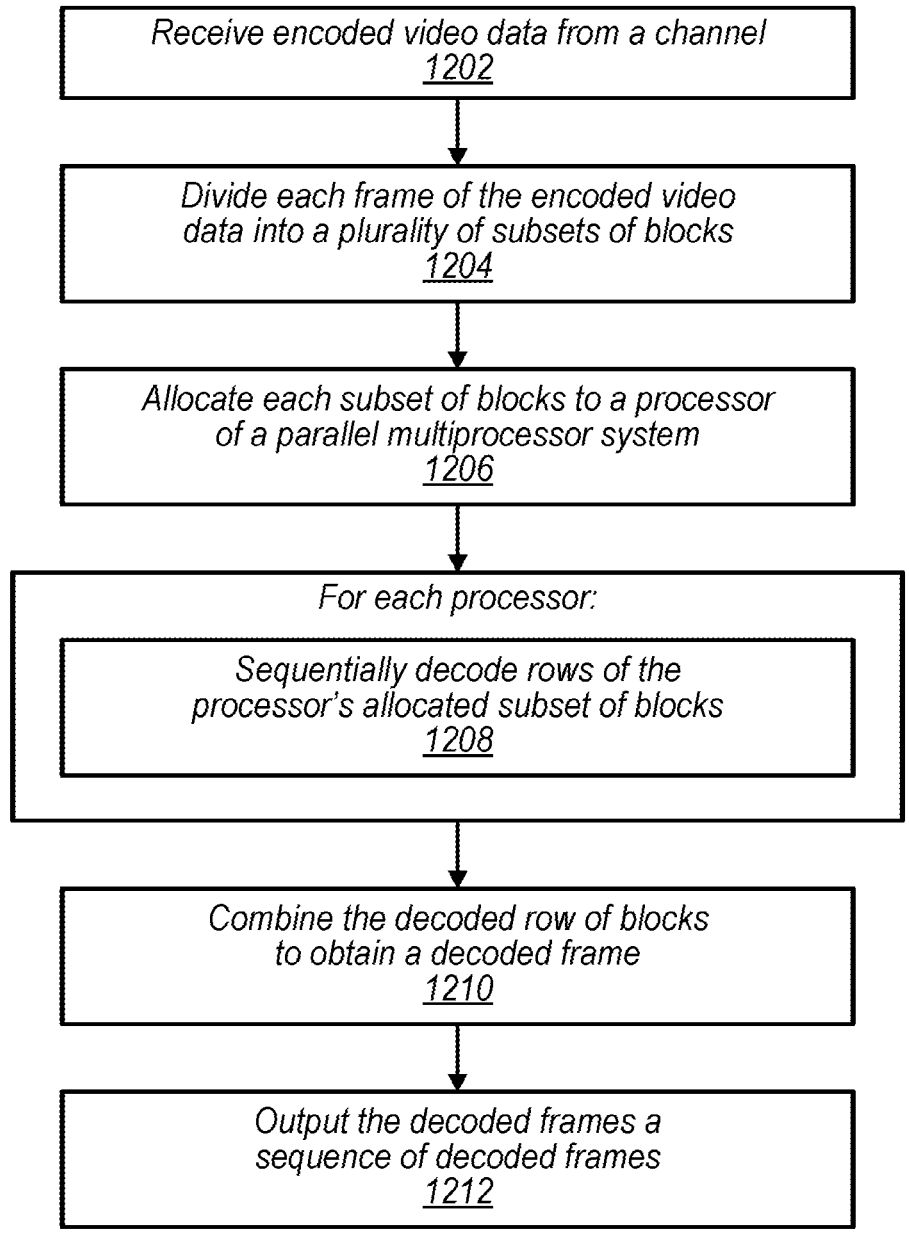
FIG. 12 is a flowchart diagram illustrating an exemplary method for a parallel multi-processor decoder system to receive and decode a sequence of encoded video frames, according to some embodiments.

FIG. 12—Parallel Subframe Latency Decoder Flowchart

FIG. 12 is a flowchart diagram illustrating an exemplary method for a parallel multi-processor decoder system to receive and decode a sequence of encoded video frames. The parallel multi-processor decoder system may be comprised within a UE 106, a personal computer, a tablet, a smart TV, a portable video player, or another type of computing device. The parallel multi-processor decoder system may comprise a plurality of parallel processors coupled to respective memory media, and may further comprise a master control processor configured to coordinate activity between the parallel processors. Some of the method elements shown may be performed concurrently, in a different order than shown, or may be omitted. Additional method elements may also be performed as desired. As shown, the method may operate as follows.

At 1202, the decoder system may receive receiving the encoded video data from a channel. The encoded video data may comprise a sequence of encoded frames, wherein each encoded frame comprises a plurality of blocks of encoded pixels in sequential rows.

At 1204, each encoded frame of the encoded video data may be divided into a plurality of subsets of blocks. In some embodiments, the subsets of the plurality of blocks may comprise one or more columns of blocks of their respective frame.

At 1206, each subset of blocks may be allocated to a respective processor of the parallel multi-processor system. Alternatively, in some embodiments, the entire encoded video data may be supplied to each processor of the parallel multi-processor system, and each processor may divide the encoded video data into a subset of blocks, for decoding by the respective processor. In other words, each processor may receive the entire encoded video frame, and may individually allocate the video frame into subportions for parallel decoding.

At 1208, each processor of the parallel multi-processor system may sequentially decode rows of the subset of blocks allocated to the respective processor. In some embodiments, independent rate control may be implemented on each of the processors of the multiprocessor system. As one example, independent rate control may serve to promote comparable coded picture buffer occupancy for each of the processors. Alternatively or additionally, independent rate control may be used to maintain a similar bit rate for each of the processors.

At 1210, the decoded rows of blocks may be combined to obtain a decoded frame. For each row, the decoded blocks of the respective row for each processor may be combined prior to combining encoded rows of blocks of a row sequential to the respective row for any processor.

At 1212, the decoded frames may be output as a sequence of decoded frames.

While the method described in FIG. 12 allocates subsets of blocks as columns of blocks and proceeds to sequentially encode each frame row by row, in other embodiments each frame may be divided into subsets comprising rows of blocks, and the parallel processors may encode each frame column by column. In other words, the rows and columns described in FIG. 12 may be switched, in other embodiments.

Process Network Model of Computation

Figure 13:
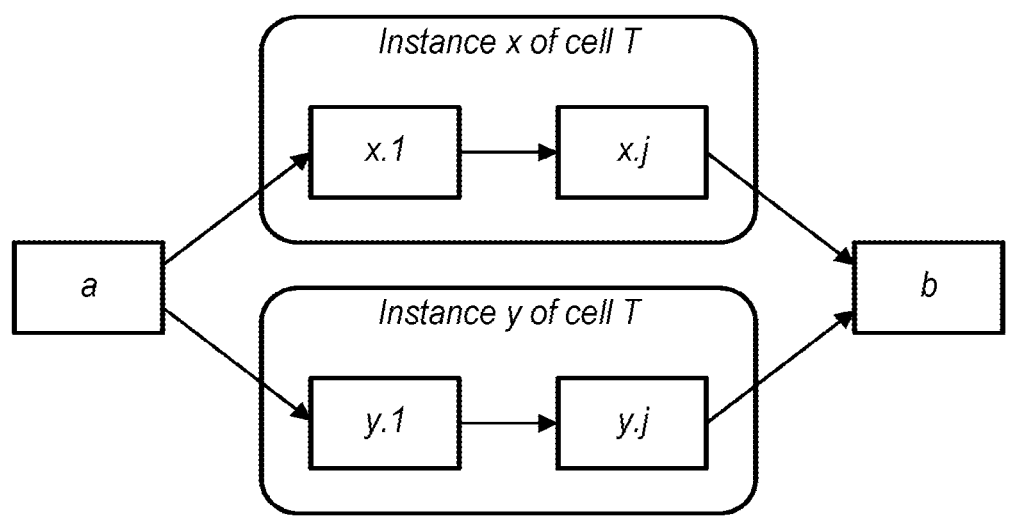
FIG. 13 is a schematic diagram illustrating an exemplary hierarchical process network with two levels, according to some embodiments.

The following paragraphs provide additional detail regarding a process network model of computation, which may be used to implement embodiments described herein. Process networks are a graphical model of computation. The term "graphical" as used in this context may refer to describing the design as a directed graph with nodes representing concurrent processes and arcs representing unidirectional communication channels. An example process network is shown in FIG. 13. Each node may be implemented as either a sub-program which follows a sequence of instructions in the conventional software sense, or as a sub-graph containing its own network of processes. In this way the model supports scalable, hierarchical designs: a graph at one hierarchical level of the design may instantiate a sub-graph of arbitrary size just with knowledge of its interface, not its internal composition. The template of a sub-graph is referred to as a cell and may be instantiated multiple times for the sake of parallel processing. The cell is a unit of composition, abstraction and reuse, analogous in many ways to a class in object-oriented methodologies.

When a node is implemented as a sub-program it follows the usual semantics of imperative programming, as in the "C" programming language, with a few differences. Data receive and data send are added to the set of primitive process operations. These are the only means of data transfer between nodes. There is no shared state between nodes and no global context shared by all nodes. Instead, each node has access to private, local memory. Data communication is a replacement for the semantics of a function call between nodes; no analogy for a function return is needed. This makes sense in a streaming application where the results of a node's computations are forwarded to the next stage in a computing pipeline, not returned to an earlier caller.

These restrictions on the usual semantics for imperative programming have important consequences on the overall software design. Nodes in the process network adhere to a principle of localization; whatever computations are occurring in one node cannot affect another except by sending and receiving data through a communication channel. Data communication is also the means of synchronization between processes. All operations within a sub-program that do not involve the data send and receive operations are assumed to be asynchronous with every other node in the design. A design expressed as a hierarchical process network inherently exposes the available parallelism of the algorithm.

Process networks may enable a rich set of parallel processing design patterns. In FIG. 13, each instance of cell T implements a task parallel pipeline. The work of the cell is divided into a sequence of two steps which doubles the throughput; the two sub-programs in cell T work concurrently on successive workloads to implement a sequential process. The two instances of cell T represent a data parallel design pattern, with each one responsible for processing half of the workloads from process a.

Process networks may include the definition of a continuous, monotonic process: a unique mapping from (potentially infinite) input data streams to one or more output data streams. A key aspect is that a process performs its computations iteratively on portions of an input stream without waiting for the whole input to be complete. Data structures such as a video frame may exist in stream form without ever being entirely present in process memory. Communicating Sequential Processes (CSP) describes a similar process network with different channel semantics and a richer set of primitive process operations, more than what is required to implement an HEVC encoder.

The process network model of computation is better suited for parallel processing than the conventional, imperative programming model which may cause the programmer to assign a sequential order between functions even when the algorithm does not require it. Then the programmer may need to unravel the artificial sequence constraints to split the code into concurrent threads, and add additional semaphore elements to prevent data hazards in shared memory. Common libraries for parallel processing such as OpenMP and OpenCL for SMP and Graphics Processing Unit (GPU) devices may generally provide only data parallel design decomposition.

Figure 14:
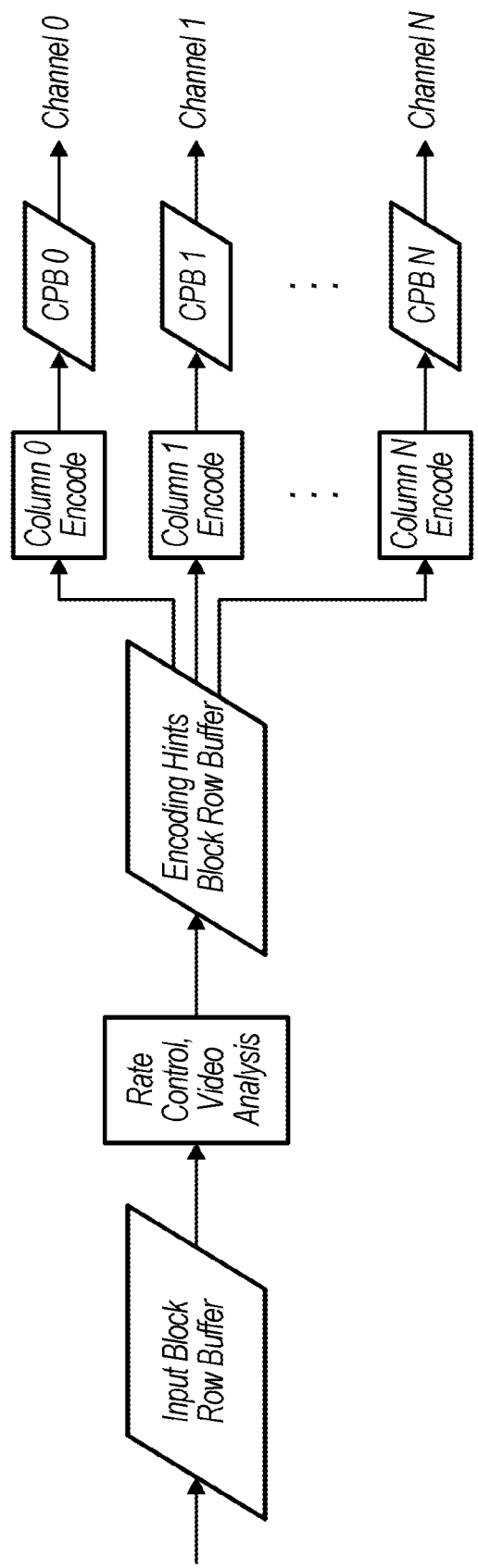
FIG. 14 is a schematic diagram illustrating an encoding pipeline with parallel processing, according to some embodiments.
Figure 15:
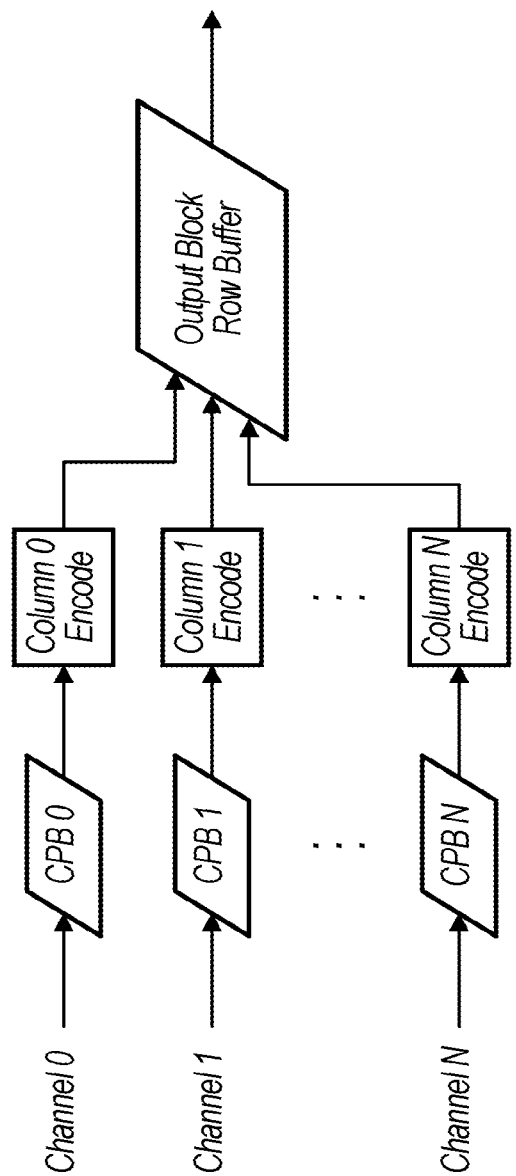
FIG. 15 is a schematic diagram illustrating a decoding pipeline with parallel processing, according to some embodiments.

FIGS. 14-15—Parallel Encoding/Decoding Pipelines

FIGS. 14 and 15 are schematic diagrams illustrating encoding and decoding pipelines with parallel processing, respectively, according to some embodiments. For example, FIG. 14 shows an encoder architecture with parallel processing. Each column encode block in FIG. 14 represents the second processing stage of the encoding pipeline shown in FIG. 5. The complementary decoding process is shown in FIG. 15.

As illustrated in FIG. 14, the network (output) interface of the encoder may have a separate virtual channel for each picture column, tile or sub-stream. As illustrated in FIG. 15, the input to the decoder connects to the set of virtual channels with a matching network interface. In some embodiments, the total target bit rate of the encoded video on the physical communication channel may be evenly divided between the virtual sub-stream channels. In some embodiments, each virtual channel may include its own set of coded picture buffers.

In some embodiments, the rate control function is applied independently to each column to ensure coded picture buffer compliance. This encoder organization may result in a system that enables parallel processing to achieve sub-frame latency in an encoder that supports inter and intra-prediction.

Embodiments of the present disclosure may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for encoding video data, wherein the video data comprises a sequence of frames, wherein each frame comprises a plurality of pixels in sequential rows, the method comprising:
for each frame:
dividing the plurality of pixels into a plurality of blocks of pixels, wherein each block is allocated to a respective processor of a parallel multi-processor system;
by each respective processor of the parallel multi-processor system:
sequentially encoding rows of the block allocated to the respective processor, wherein said encoding the rows of the block is in accord with an encoding of rows of a tile of a High Efficiency Video Coding (HEVC) standard; and
sequentially transmitting each encoded row of the block as a bit stream to a decoder on a respective channel, wherein each respective channel comprises a respective set of coded picture buffers,
wherein each processor of the parallel multi-processor system transmits its respective bit stream on a distinct respective channel.

2. The method of claim 1,
wherein a total target bit rate of the bit streams is evenly divided between the different channels.

3. The method of claim 1,
wherein dividing the plurality of pixels of each frame into the plurality of blocks of pixels comprises evenly dividing the plurality of pixels of each frame into a plurality of columns.

4. The method of claim 1,
wherein a rate control function is applied independently for the blocks allocated to different processors of the parallel multiprocessor system.

5. The method of claim 4,
wherein independent application of the rate control function for the blocks allocated to different processors of the parallel multiprocessor system results in coded picture buffer compliance for respective sets of coded picture buffers.

6. The method of claim 1,
wherein said encoding comprises encoding non-intra-refresh pixels with or without reference to a previous encoded frame, and wherein intra-refresh pixels are encoded without reference to the previous encoded frame.

7. The method of claim 1, the method further comprising:
storing the encoded rows of the blocks as a respective encoded frame in a memory buffer accessible to the processors of the parallel multiprocessor system.

8. The method of claim 1, the method further comprising:
performing video analysis to determine encoding hints for each row of the blocks; and
communicating the respective encoding hints for each row of the blocks to each processor of the parallel multi-processor system.

9. A parallel multi-processor video encoder system, comprising:
a plurality of parallel processors coupled to respective non-transitory computer readable memory media,
wherein the parallel multi-processor video encoder system is configured to encode video data comprising a sequence of frames, wherein each frame of the sequence of frames comprises a respective plurality of pixels, wherein, in encoding the video data, the parallel multi-processor video encoder system is configured to, for each frame:
divide the plurality of pixels of the respective frame into a plurality of blocks of pixels;
allocate each block of pixels of the plurality of blocks of pixels to a respective processor of the plurality of parallel processors; and
by each processor of the plurality of parallel processors:
sequentially encode rows of the block allocated to the respective processor;
assign the encoded rows of the block to a tile of a High Efficiency Video Coding (HEVC) standard;
reorder the encoded rows of the plurality of blocks of pixels into a normative order specified by the HEVC standard; and
transmit each reordered encoded row of the reordered encoded rows of the plurality of blocks as a bit stream to a decoder over a respective channel, wherein each respective channel comprises a respective set of coded picture buffers.

10. The parallel multi-processor video encoder system of claim 9,
wherein dividing the plurality of pixels of each frame into the plurality of blocks of pixels comprises evenly dividing the plurality of pixels of each frame into a plurality of columns.

11. The parallel multi-processor video encoder system of claim 9,
wherein a rate control function is applied independently for the blocks allocated to different processors of the parallel multiprocessor system.

12. The parallel multi-processor video encoder system of claim 11,
wherein independent application of the rate control function independently for the blocks allocated to different processors of the parallel multiprocessor system results in coded picture buffer compliance for the respective sets of coded picture buffers.

13. The parallel multi-processor video encoder system of claim 9,
wherein said encoding comprises encoding non-intra-refresh pixels with or without reference to a previous encoded frame, and wherein intra-refresh pixels are encoded without reference to the previous encoded frame.

14. The parallel multi-processor video encoder system of claim 9, wherein the parallel multi-processor video encoder system is further configured to:
store the encoded rows of the blocks as a respective encoded frame in a memory buffer accessible to the processors of the parallel multiprocessor system.

15. The parallel multi-processor video encoder system of claim 9, wherein the parallel multi-processor video encoder system is further configured to:
perform video analysis to determine encoding hints for each row of the blocks; and
communicate the respective encoding hints for each row of the blocks to each of the plurality of parallel processors.

16. A method for decoding encoded video data, wherein the encoded video data comprises a sequence of encoded frames, wherein each encoded frame comprises a plurality of blocks of encoded pixels, the method comprising:
for each encoded frame:
receiving the plurality of blocks as respective bit streams through a plurality of respective channels, wherein each respective channel comprises a respective set of coded picture buffers;
reordering tiles of the plurality of blocks into a normative order specified by a High Efficiency Video Coding (HEVC) standard; and
decoding the tiles with a HEVC decoder to produce a decoded frame;
concatenating the decoded frames to produce a stream of video data; and
outputting the stream of video data.

17. The method of claim 16,
wherein each of the plurality of channels comprises a respective set of coded picture buffers.

18. The method of claim 16,
wherein a total target bit rate of the bit streams is evenly divided between the channels.

19. The method of claim 16,
wherein the plurality of blocks comprises rows or columns of pixels of their respective frame.

20. The method of claim 16,
wherein said decoding comprises decoding non-intra-refresh pixels with or without reference to a previous decoded frame, and wherein intra-refresh pixels are decoded without reference to the previous decoded frame.

* * * * *